Oct. 17, 1933.  A. B. BYRD  1,930,874
WEAR PLATE FOR RUBBER HEELS
Filed Feb. 15, 1932
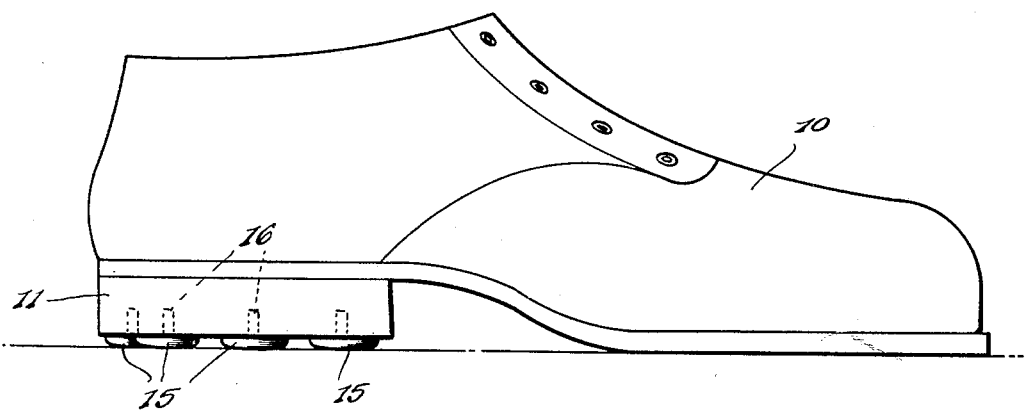
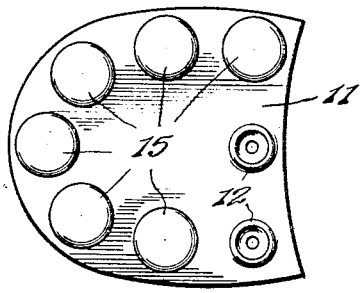
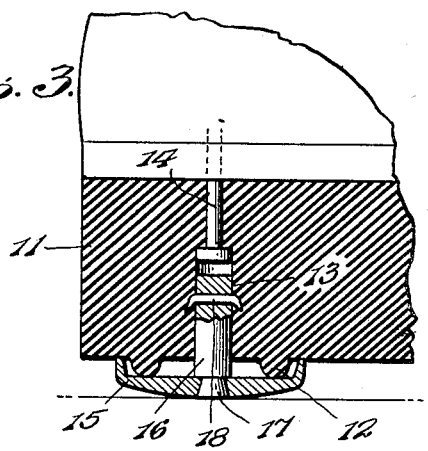
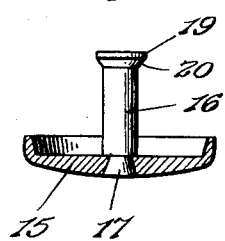
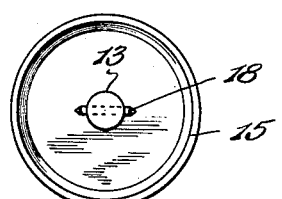

Patented Oct. 17, 1933

1,930,874

UNITED STATES PATENT OFFICE 1,930,874

WEAR PLATE FOR RUBBER HEELS

Alva B. Byrd, Sikeston, Mo.

Application February 15, 1932. Serial No. 593,128
1 Claim. (Cl. 36—73)

This invention relates to wear plates for rubber heels, and has for an object to provide a dished metal member for sealing the suction cup on a rubber heel so that the long life of the heel and proper shape thereof will be greatly promoted.

A further object is to provide a button or dished member having an axial pin adapted to enter the nail hole of the suction cup and engage the rubber wall of the nail hole to anchor the member permanently in position.

A further object is to provide a wear plate of the above described character which may be formed of a few simple, strong and durable parts which will not easily get out of order and which may be manufactured at minimum cost.

With the above and other objects in view the invention consists in certain novel details of construction and combinations of parts hereinafter fully described and claimed it being understood that various modifications may be resorted to within the scope of the appended claim without departing from the spirit or sacrificing any of the advantages of the invention.

In the accompanying drawing forming part of this specification,

Figure 1 is a side elevation of a shoe having a rubber heel equipped with my improved wear plates, Figure 2 is a plan view of the rubber heel shown in Figure 1, Figure 3 is an enlarged detail section showing a wear plate applied to a suction cup in a rubber heel, Figure 4 is a plan view of the wear plate and, Figure 5 is a cross section through a modified form of wear plate.

Referring now to the drawing in which like characters of reference designate similar parts in the various views, 10 designates a shoe which is equipped with a conventional rubber heel 11 having suction cups 12, best shown in Figures 2 and 3 of the usual annular type, each suction cup surrounding a nail hole 13 which receives a corresponding securing nail 14 for the rubber heel. These parts are of the usual and well known type.

In carrying out the invention I provide a button or dished metal member 15 of sufficient size to telescopically receive a suction cup 12 and bear with its edge against the bottom surface of the rubber heel around the outside of the suction cup, as best shown in Figure 3.

A pin 16 is provided with a rivet head 17 which secures the pin to the center of the dished surface of the metal member or wear plate as it will hereinafter be called. The pin is preferably cylindrical in cross section and extends axially from the wear plate so as to readily enter the nail hole 13 and frictionally engage the rubber wall of the nail hole so as to prevent dislodgement of the wear plate. The pin terminates in a blunt flat tip adapted to drive the nail home should it be loose or not completely driven.

However, it is not intended to depend upon such frictional engagement alone to hold the wear plate in position since, as seen by referring to Figures 3 and 4, a barb 18 is passed transversely through the pin near the tip end. The ends of the barb are bent rearwardly toward the wear plate 15. The barb penetrates the rubber wall of the nail hole when the pin is driven thereinto and prevents backing off of the wear plate from the heel.

A modified form of the invention is shown in Figure 5, the modification being directed especially to the anchoring means for the pin so that the remainder of the structure has been given the same numerals as in the preferred form.

The pin 16 is, in the modified form of the invention, provided with a boss 19 at the tip which is of greater diameter than the diameter of the pin and is beveled, as shown at 20 on the lower face. This boss compresses ahead of it the rubber wall of the nail hole when the pin is driven into the nail wall, the rubber closing in back of the boss when the pin is driven home and lodging underneath the beveled surface 20 so as to prevent backing off of the wear plate as will be understood.

From the above description it will be seen that I have provided an extremely simple and inexpensive wear plate which may be readily applied to a rubber heel to seal each suction cup thereof, that the wear plate may be applied without tools, or at best with light blows of a hammer, and then when in applied position the wear plate is prevented from becoming lost or from backing out of the nail hole. The wear plate will, furthermore, protect the suction cups from wear and it naturally follows that the wear plates will space the bottom of the heel above the ground so that the heel will not become worn off at an edge and thus its neat appearance and permanent shape will be promoted as well as the comfort attendant upon the use of new rubber heels similarly promoted through a longer life than hitherto possible.

What is claimed is:

A wear plate for sealing a suction cup upon a rubber heel comprising a dished member adapted to telescopically receive the suction cup, a pin extending axially from the dished surface of the member adapted to enter the nail hole in the suction cup and having a blunt tip for driving the nail home should it be loose, and a backwardly directed spur in rear of the tip of the pin adapted to engage the rubber wall of the nail hole which the suction cup surrounds and prevent backing off of said member from the suction cup.

ALVA B. BYRD. [L. S.]